United States Patent Office 2,892,648
Patented June 30, 1959

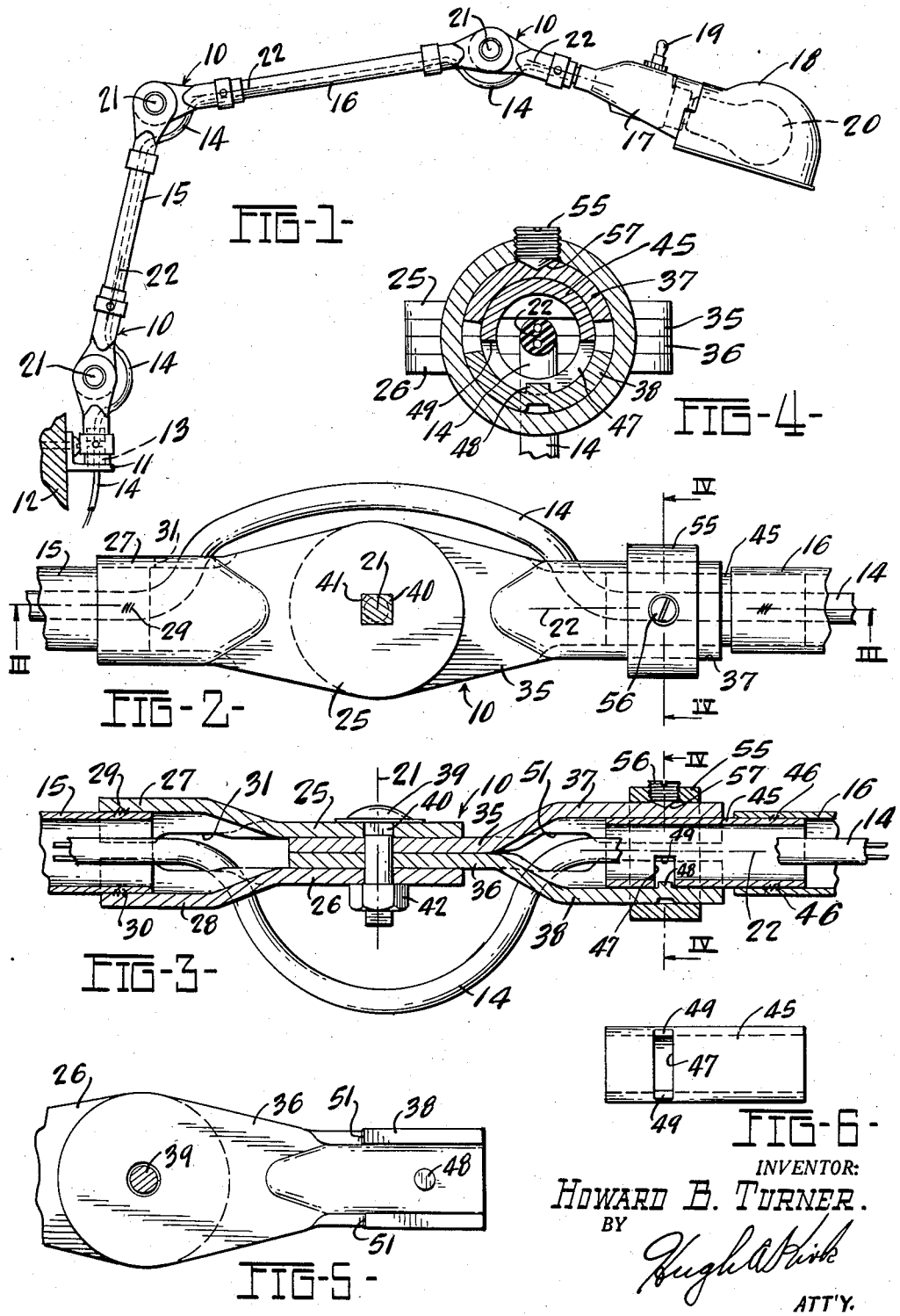

2,892,648

FRICTIONALLY ADJUSTABLE UNIVERSAL JOINT

Howard B. Turner, Fostoria, Ohio

Application April 18, 1955, Serial No. 501,792

5 Claims. (Cl. 287—100)

This invention relates to a frictionally adjustable universal type joint. More particularly, it deals with such a joint having two perpendicular axes of rotation around which axes the parts of the joint are limited from complete relative rotation. Such a frictional adjustable universal joint finds application, for example, as a connector between parts of articulated electrical lamp supports along which supports insulated electrical conductors or cords extend.

It is an object of this invention to produce a simple, efficient, effective, economic and durable frictionally adjustable universal type joint which is limited in its relative rotational movement.

Another object is to produce such a joint of relatively few and similar parts which may be easily assembled.

Another object is to produce such a universal joint support in which the frictional movements of the parts may be readily and easily adjusted and increased as the parts wear, so as to maintain sufficient friction between the parts for maintaining them in any desired position.

Another object is to produce such a universal type joint support around and through which an insulated electric conductor or conductors may extend without being twisted, pinched or worn to cause possible short circuits, electrical shocks, or fires.

Generally speaking, the frictionally adjustable universal joint of this invention comprises two perpendicular intersecting axes of rotation with the axles on these axes being spaced relative to each other. One of the axles is formed by a bolt through the centers of spaced parallel pair of discs between which another disc is clamped, with the bolt adjusting the clamping friction of the outer pair of discs against the inner disc. The other axle of rotation is formed by a sleeve clamped between a pair of semi-cylindrical socket forming members, which socket members may be attached to one of the discs rotatable about the first mentioned axle. The socket members may be adjusted to frictionally engage a sleeve and include means to limit their relative rotation about the sleeve. The two parts which are to be connected by the joint may be connected to the outer pair of clamping discs at one end of the joint and to the sleeve at the other end of the joint. Apertures may be provided on either side of the discs for an electric cord to bridge the bolt and discs and extend through the sleeve.

The disc clamped between the pairs of parallel discs may also comprise a pair of discs each having a semi-cylindrical extension which extensions may cooperate to form the socket for the sleeve. This socket may be surrounded in turn by a ring having means such as a set screw for urging the two semi-cylindrical socket portions together to adjust their frictional engagement with the sleeve. One of the semi-cylindrical socket members may also be provided with an inwardly extending lug or projection which cooperates with a partial circumferential slot in the sleeve, whereby the relative motion of the extension is limited by the ends of the slot to prevent complete relative rotation of the sleeve with respect to the socket.

The use of two or more of these frictionally adjustable universal joints in a support for an electric lamp permits substantially complete universality of adjustment of the lamp with respect to its base. A preferred embodiment of such a lamp support comprises at least two tubular links through which a lamp cord may extend, which links are connected together and to a rigid base at one end and to a lamp socket and shade portion at the other, the connections being made by means of three of the frictionally adjustable universal joints of this invention. However, one or a plurality of links and joints may be provided in a support to meet substantially any requirements, such as for example, the supporting of an electric lamp on a machine tool which lamp may be adjusted in different positions for illuminating any portion of the work.

The above mentioned and other features and objects of this invention and the manner of attaining them will become more apparent and the invention itself will be best understood by reference to the following description of an embodiment of this invention taken in conjunction with the accompanying drawings, wherein:

Fig. 1 is a side elevation of a lamp support embodying three frictionally adjustable universal joints according to this invention;

Fig. 2 is an enlarged side elevation of one of the joints shown in Fig. 1 with its ends aligned and with some parts being broken away;

Fig. 3 is a sectional view along line III—III of Fig. 2 taken in the direction of the arrows;

Fig. 4 is an enlarged sectional view along line IV—IV of Fig. 2 or 3 taken in the direction of the arrows;

Fig. 5 is a plan view of one of the disc and semi-cylindrical socket members of the joint shown in Figs. 2 and 3 with parts being broken away; and Fig. 6 is a side elevational view of the sleeve portion of the joint shown in Figs. 3 and 4 showing the slot in the sleeve.

Referring now to Fig. 1 of the drawing, three frictionally adjustable universal type joints 10 according to this invention have been adapted to an articulated lamp support. This particular lamp support may comprise an L-shaped base member 11 which may be anchored to a stationary support or wall 12 and have a hollow central tubular portion 13 through which the insulated electric conductor or cord 14 to the lamp may extend and around which one end of one joint 10 may be clamped, anchored or attached. This particular lamp support also comprises two tubular links 15 and 16, the ends of which are connected to the joints 10. The outer end of the support and last link may be attached directly to an electric socket having member 17 which also may have attached to it an electric light bulb shield 18 and an electric light switch 19 extending from an electric socket into which may be screwed an electric light bulb 20.

Each of the frictionally adjustable universal joints 10 comprises two perpendicular axes 21 and 22 (see Figs. 2 and 3) around which limited rotation of the parts of the joint is permitted. These two axes intersect each other at right angles but the axles of rotation mounted on these axes are spaced with respect to each other.

One portion or end of the joint, which may be attached to one of the tubular links 15 or 16, base portion 13, or other supporting member, may comprise a pair of similar parallel disc providing members 25 and 26 having cooperating substantially semi-cylindrical extensions 27 and 28, respectively, which extensions may form a socket for an end of a supporting member 13, 15 or 16 and may be welded at 29 and 30 or otherwise rigidly attached to said supporting member. Between the spaced pair of extensions 27 and 28 and discs 25 and 26 there may be provided sufficient gap or aperture 31 for an electric cord 14 to freely extend from out of the center of a tubular support 15 to bridge the discs around the axis 21. In the space between the two discs 25 and 26 there may be frictionally clamped a third disc, or herein a second similar pair of discs 35 and 36 which also have semi-cylindrical extensions 37 and 38, respectively, which extensions form a socket or bearing for the axle on the second rotational axis 22 of the joint. Through the centers of the discs 25, 35, 36 and 26 are aligned holes through which a bolt 39 may extend as the axle on the axis 21, which bolt may have a square shank section 40 that fits into a square hole 41 in one of the discs 25 to prevent the bolt from turning when its nut 42 is turned for adjusting the clamping friction of the discs 35 and 36 between the discs 25 and 26. Thus, the relatively large surface between the discs 25 and 35 and 26 and 36 permit good frictional engagements between two of the parts of the joint 10, which parts are permitted limited rotation about the axis 21 of the bolt 39. This rotation about the axis 21 is limited by the abutting engagements of the semi-cylindrical projections 27, 28, 37 and 38 on the discs so that a complete rotation about the axis 21 is prevented.

The split socket formed by the cooperating pair of semi-cylindrical extensions 37 and 38 is herein shown to surround one end of a cylindrical sleeve 45, forming the axle or the axis 22. The other, and the outer end of this sleeve 45 forms the other end of the joint 10 and may be rigidly attached to the adjacent supporting member such as an end of the link 15 or 16 by welds 46 or other rigid connection. The portion of the sleeve 45 surrounded by the portions 37 and 38 may be limited in its relative rotation with respect to the socket portions by a partially circumferential slot 47 in the sleeve 45 in which slot a fixed or raised lug or projection 48 projects from the inside of one of the semi-cylindrical extensions 38 (see also Figs. 3, 4, 5 and 6). Thus, relative rotation of the joint 10 with respect to the sleeve 45 is limited by the contact of the lug 48 with the ends 49 of the slot 47, so that the extension of an insulated flexible electrical conducting cord 14 through the tubular member 16 and sleeve 45 is prevented from being twisted even one revolution when it is also extended through the aperture 51 (similar to the aperture 31) between the discs 35 and 36 and socket portions 37 and 38 to bridge the discs around the axis 21.

In order to further maintain and frictionally adjust the semi-cylindrical socket portions 37 and 38 around the sleeve 45, there may be provided a surrounding sleeve or ring 55 which has threadably mounted therein a set screw 56 which may engage a detent 57 in the outside of one of the semi-cylindrical socket portions 37, so that as the set screw 56 is turned to further engage in the detent 57 the two socket portions 37 and 38 are forced together to adjust the frictional clamping of the ring 45 by the socket portions 37 and 38. The ring 55 also aids in maintaining the lug 48 in the slot 47.

Accordingly, the frictional engagement between the discs 25, 35, 26, 36 and the sockets 37, 38 with the ring 45 may both be increased or decreased to prevent or permit more easy relative movement of the parts of the joint 10 about their two respective axes of rotation 21 and 22, to compensate for wear and be adapted to different loads supported through the joint 10.

If desired, the bolt 39 and nut 42 may be replaced by a threaded bolt which may be threaded into one of the portions 25 or 26 and turned by means of a wrench or screw driver, without departing from the scope of this invention. Similarly the slotted set screw 56 may have an Allen type wrench fitting or may be replaced by a headed bolt. Also instead of the offset extension 48 a separate pin or rivet may be mounted through a hole in the member 38 for engagement in the slot 47.

Although the specific joint 10 of this invention has been shown and described in cooperation with a support for an electric lamp, the joint may be used for other purposes wherein frictional universal adjustment is desired between two members, which members may be tubular to provide for an electric conductor between them and around the joint or not.

This invention is an improvement of the invention disclosed in copending application of Howard B. Turner, Serial No. 305,750, filed August 22, 1952, now Patent No. 2,763,500, issued September 18, 1956, for a universal joint also adapted for limited relative rotational movement and electric light supports.

While there is described above the principles of this invention in connection with specific apparatus, it is to be clearly understood that this description is made only by way of example and not as a limitation to the scope of this invention.

What is claimed is:

1. A universal joint between two members comprising: a first pair of parallel spaced discs with aligned central holes, said discs being attached to an end of one of said members and having an aperture between said discs and said one member, a second pair of parallel discs with aligned central holes positioned between said first pair of discs and having cooperating semi-cylindrical extensions having their axes in the plane of said discs forming a socket having an axis perpendicular to that of said holes and having an aperture between said discs and said socket, a bolt extending through said aligned holes for adjustably frictionally clamping said second discs between said first discs and permitting limited rotation of less than 360° about said axis of said bolt, a sleeve having a partial circumferential slot and attached to another and adjacent one of said members and rotatable in said socket, an inwardly extending projection on one of said semi-cylindrical socket portions cooperating in said slot to limit the rotation of said sleeve to less than 360° relative to said socket, and an outer ring surrounding said semi-cylindrical socket portions to maintain said projection in said slot and frictionally adjustably clamp said socket portions with said sleeve.

2. A joint according to claim 1 wherein one of said holes in said first pair of discs is square, said bolt has a cooperating square portion and a threaded end, and a threaded nut for said bolt.

3. A joint according to claim 1 including means for maintaining said outer ring around said socket.

4. A joint according to claim 3 wherein said means for maintaining said ring around said socket comprises an adjustable set screw mounted in said ring.

5. A lamp support according to claim 1 having an insulated electrical conductor and wherein said apertures between said disc portions are openings for said conductor for bridging said bolt and extending through said sleeve.

References Cited in the file of this patent

UNITED STATES PATENTS

| 505,585 | White | Sept. 26, 1893 |
| 546,459 | White | Sept. 17, 1895 |
| 629,185 | Arnold | July 18, 1899 |
| 1,036,676 | Miller | Aug. 27, 1912 |
| 1,283,446 | Anderson | Nov. 5, 1918 |
| 1,491,893 | Anderson | Apr. 29, 1924 |
| 1,784,121 | Walsh | Dec. 9, 1930 |
| 2,617,619 | Versen | Nov. 11, 1952 |
| 2,686,067 | Stephans | Aug. 10, 1954 |

FOREIGN PATENTS

| 876,429 | France | Aug. 3, 1942 |